United States Patent

(12) United States Patent
Abe

(10) Patent No.: US 8,126,207 B2
(45) Date of Patent: Feb. 28, 2012

(54) SUBJECT TRACKING METHOD, SUBJECT TRACKING DEVICE, AND COMPUTER PROGRAM PRODUCT

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 860 days.

(21) Appl. No.: 12/230,008

(22) Filed: Aug. 21, 2008

(65) Prior Publication Data

US 2009/0052741 A1  Feb. 26, 2009

(30) Foreign Application Priority Data

Aug. 24, 2007  (JP) ................. 2007-218328

(51) Int. Cl.
 *G06K 9/00* (2006.01)
(52) U.S. Cl. ...................................... 382/103
(58) Field of Classification Search .................. 382/103, 382/218, 219, 220; 348/169, 208; 235/411; 342/95, 96
 See application file for complete search history.

(56) References Cited

U.S. PATENT DOCUMENTS

| | | | |
|---|---|---|---|
| 5,208,667 A | 5/1993 | Saunders | |
| 5,625,715 A * | 4/1997 | Trew et al. | 382/236 |
| 5,699,129 A | 12/1997 | Tayama | |
| 5,872,604 A | 2/1999 | Ogura | |
| 5,912,980 A * | 6/1999 | Hunke | 382/103 |
| 6,233,008 B1 * | 5/2001 | Chun | 348/170 |
| 7,227,893 B1 * | 6/2007 | Srinivasa et al. | 375/240.08 |
| 7,397,931 B2 * | 7/2008 | Imagawa et al. | 382/103 |
| 7,672,510 B2 * | 3/2010 | Nagaoka et al. | 382/170 |
| 2004/0125984 A1 * | 7/2004 | Ito et al. | 382/103 |
| 2004/0136567 A1 * | 7/2004 | Billinghurst et al. | 382/103 |
| 2005/0196017 A1 * | 9/2005 | Altherr et al. | 382/103 |
| 2007/0009028 A1 * | 1/2007 | Lee et al. | 375/240.08 |
| 2009/0175496 A1 * | 7/2009 | Kondo et al. | 382/103 |

FOREIGN PATENT DOCUMENTS

JP  A-05-081433  4/1993

OTHER PUBLICATIONS

Cox et al; "An Efficient Implementation and Evaluation of Reid's Multiple Hypothesis Tracking Algorithm for Visual Tracking"; *IEEE Computer Sociology—Pattern Recognition*, 1994, vol. 1—Conference A: *Computer Vision and IM Age Processing., Proceedings of the 12th IAPR International Conference* on Jerusalem, Israel., Oct. 9-13, 1994, Los Alamitos, California, USA; Oct. 9, 1994; pp. 437-442; vol. 1.

Yilmaz et al; "Object Tracking: A Survey"; *ACM Computer Surveys*; Dec. 1, 2006; pp. 22-25; vol. 38—Issue 4; New York, New York, USA.

Xi et al; "A fast block-matching algorithm based on adaptive search area and its VLSI architecture for H.264/AVC"; *Signal Processing: Image Communication*; Sep. 1, 2006; pp. 626-646; vol. 21—Issue 8; Elsevier Science Publishers; Amsterdam, The Netherlands.

* cited by examiner

*Primary Examiner* — Jason M Repko
*Assistant Examiner* — Shervin Nakhjavan
(74) *Attorney, Agent, or Firm* — Oliff & Berridge, PLC

(57) ABSTRACT

A subject tracking method, includes: calculating a similarity factor indicating a level of similarity between an image contained in a search frame at each search frame position and a template image by shifting the search frame within a search target area set in each of individual frames of input images input in time sequence; determining a position of the search frame for which a highest similarity factor value has been calculated, within each input image to be a position (subject position) at which a subject is present; tracking the subject position thus determined through the individual frames of input images; calculating a difference between a highest similarity factor value and a second highest similarity factor value; and setting the search target area for a next frame based upon the calculated difference.

15 Claims, 7 Drawing Sheets 0.8

0.015

SUBJECT TRACKING METHOD, SUBJECT TRACKING DEVICE, AND COMPUTER PROGRAM PRODUCT

INCORPORATION BY REFERENCE

The disclosure of the following priority application is herein incorporated by reference: Japanese Patent Application No. 2007-218328 filed Aug. 24, 2007.

BACKGROUND OF THE INVENTION

1. Field of the Invention

The present invention relates to a subject tracking method, a subject tracking device and a computer program product that enable frame-to-frame tracking of a photographic subject.

2. Description of Related Art

In a pattern matching method known in the related art, an image is divided into a plurality of areas, the areas then individually undergo template matching processing and the area indicating the highest level of similarity is extracted as a matching area (see Japanese Laid Open Patent Publication No. H5-81433).

SUMMARY OF THE INVENTION

However, as the subject position within an image is determined and the subject position is tracked from frame to frame through template matching executed through the pattern matching method in the related art, false matching may occur and accurate subject tracking may not be possible if the background contains an image portion similar to the template.

According to the 1st aspect of the present invention, a subject tracking method, comprises: calculating a similarity factor indicating a level of similarity between an image contained in a search frame at each search frame position and a template image by shifting the search frame within a search target area set in each of individual frames of input images input in time sequence; determining a position of the search frame for which a highest similarity factor value has been calculated, within each input image to be a position (subject position) at which a subject is present; tracking the subject position thus determined through the individual frames of input images; calculating a difference between a highest similarity factor value and a second highest similarity factor value; and setting the search target area for a next frame based upon the calculated difference.

According to the 2nd aspect of the present invention, in the subject tracking method according to the 1st aspect, it is preferred that: if the difference is equal to or less than a predetermined threshold value, a search frame position with the highest similarity factor value and a search frame position with the second highest similarity factor value are both designated as subject position candidates; and the search target area for the next frame is set based upon the search frame positions designated as the subject position candidates.

According to the 3rd aspect of the present invention, in the subject tracking method according to the 1st aspect, it is preferred that: if the difference is greater than a predetermined threshold value, a search frame position with the highest similarity factor value is designated as a subject position candidate; and the search target area for the next frame is set based upon the search frame position designated as the subject position candidate.

According to the 4th aspect of the present invention, in the subject tracking method according to the 1st aspect, it is preferred that: if the difference is equal to or less than a predetermined threshold value, a search frame position with the highest similarity factor value and a search frame position with the second highest similarity factor value are both designated as subject position candidates; if the difference is greater than the threshold value, a search frame position with the highest similarity factor value is designated as a subject position candidate; and the search target area for the next frame is set based upon the search target position(s) designated as the subject position candidate(s).

According to the 5th aspect of the present invention, in the subject tracking method according to the 2nd aspect, it is preferred that an area of a predetermined size, containing the search frame at each of the search frame positions designated as the subject position candidates, is set as the search target area for the next frame.

According to the 6th aspect of the present invention, in the subject tracking method according to the 5th aspect, it is preferred that the size of the search target area is determined based upon the similarity factor value calculated for the corresponding search frame.

According to the 7th aspect of the present invention, in the subject tracking method according to the 1st aspect, it is preferred that: if a plurality of search target areas is set, similarity factor values are calculated in correspondence to each of the search target areas; and the position of the search frame for which the highest similarity factor value has been calculated in the input image is determined to be the subject position.

According to the 8th aspect of the present invention, a computer-readable computer program product contains a subject tracking control program. The control program comprises: a similarity factor calculation instruction for calculating a similarity factor value indicating a level of similarity between an image contained in a search frame at each search frame position and a template image by shifting the search frame within a search target area set in each of individual frames of input images input in time sequence; a subject position determination instruction for determining a position of the search target for which a highest similarity factor value has been calculated in the similarity factor calculation instruction within each input image to be a position (subject position) at which a subject is present; a subject tracking instruction for tracking the subject position determined in the subject position determination instruction through the individual frames of input images; a difference calculation instruction for calculating a difference between the highest similarity factor value and a second highest similarity factor value, both calculated in the similarity factor calculation instruction; and a search target area setting instruction for setting the search target area for a next frame based upon the difference calculated in the difference calculation instruction.

According to the 9th aspect of the present invention, in the computer-readable computer program product according to the 8th aspect, it is preferred that: the control program further comprises a subject position candidate designation instruction for designating a search frame position with the highest similarity factor value and a search frame position with the second highest similarity factor value as subject position candidates when the difference calculated in the difference calculation instruction is equal to or less than a predetermined threshold value; and in the search target area setting instruction, the search target area for the next frame is set based upon the search frame positions designated as the subject position candidates in the subject position candidate designation instruction.

According to the 10th aspect of the present invention, in the computer-readable computer program product according to the 8th aspect, it is preferred that: the control program further comprises a subject position candidate designation instruction for designating a search frame position with the highest similarity factor value as a subject-position candidate when the difference calculated in the difference calculation instruction is greater than a predetermined threshold value; and in the search target area setting instruction, the search target area for the next frame is set based upon the search frame position designated as the subject position candidate in the subject position candidate designation instruction.

According to the 11th aspect of the present invention, in the computer-readable computer program product according to the 8th aspect, it is preferred that: the control program further comprises a subject position candidate designation instruction for designating a search frame position with the highest similarity factor value and a search frame position with the second highest similarity factor value as subject position candidates when the difference calculated in the difference calculation instruction is equal to or less than a predetermined threshold value, and designating a search frame position with the highest similarity factor value as a subject position candidate when the difference calculated in the difference calculation instruction is greater than the threshold value; and in the search target area setting instruction, the search target area for the next frame is set based upon the search frame position(s) designated as the subject position candidate(s) in the subject position candidate designation instruction.

According to the 12th aspect of the present invention, in the computer-readable computer program product according to the 9th aspect, it is preferred that in the search target area setting instruction, an area assuming a predetermined size, containing the search frame at each of the search frame positions designated as subject position candidates in the subject position candidate designation instruction, is set as the search target area for the next frame.

According to the 13th aspect of the present invention, in the computer-readable computer program product according to the 12th aspect, it is preferred that in the search target area setting instruction, the size of the search target area is determined based upon the similarity factor value calculated for the corresponding search frame.

According to the 14th aspect of the present invention, in the computer-readable computer program product according to the 8th aspect, it is preferred that if a plurality of search target areas are set in the search target area setting instruction, similarity factor values are calculated in correspondence to each of the search target areas in the similarity factor calculation instruction, and the position of the search frame for which the highest similarity factor value has been calculated within the input image in the similarity factor calculation instruction, is determined to be the subject position in the subject position determination instruction.

According to the 15th aspect of the present invention, a subject tracking device comprises an execution device that executes a control program according to the 8th aspect.

According to the 16th aspect of the present invention, in the computer-readable computer program product according to the 8th aspect, it is preferred that the computer-readable computer program product is a recording medium having recorded therein the control program.

According to the 17th aspect of the present invention, in the computer-readable computer program product according to the 8th aspect, it is preferred that the computer-readable computer program product is a data signal in which the control program is embodied on a carrier wave.

DESCRIPTION OF PREFERRED EMBODIMENTS

Figure 1:
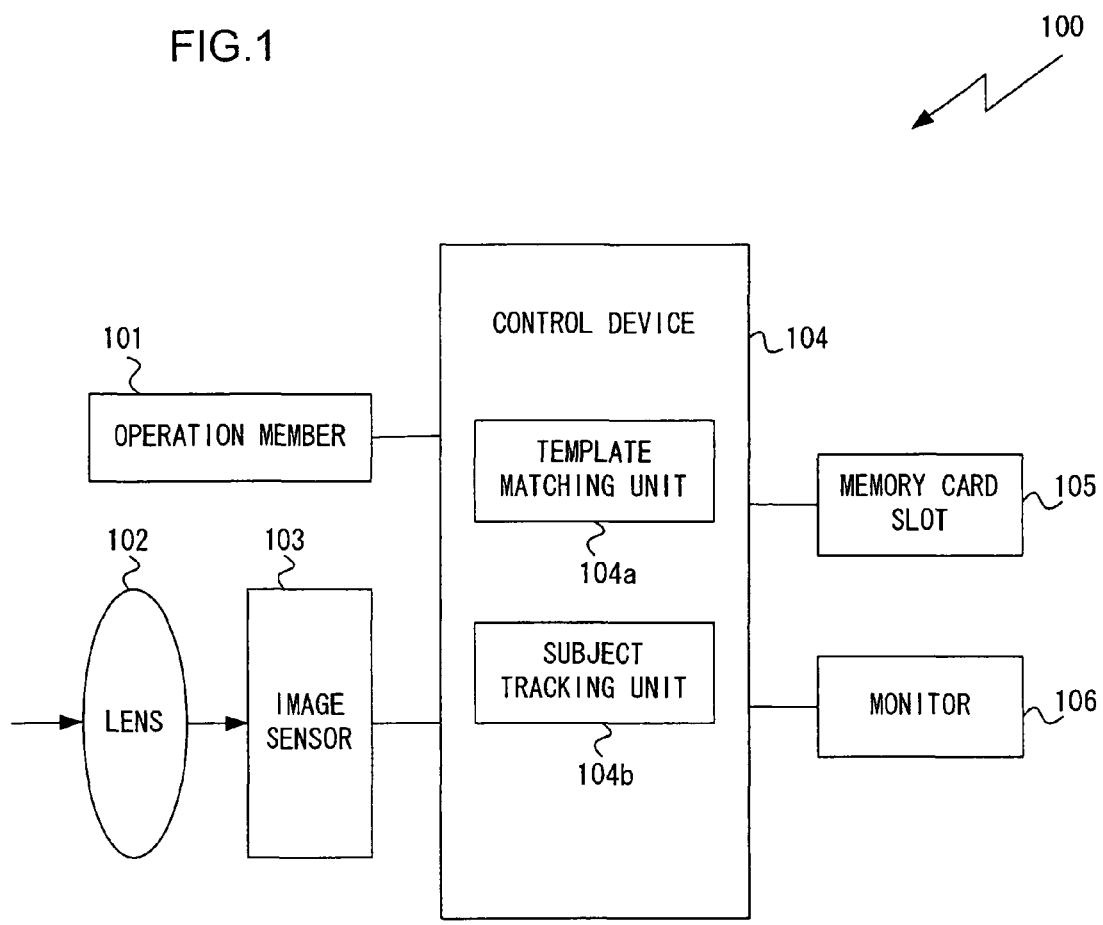
FIG. 1 is a block diagram illustrating the structure of the camera achieved in an embodiment.

FIG. 1 is a block diagram showing the structure of the camera embodying the subject tracking device according to the present invention. The camera 100 comprises an operation member 101, a lens 102, an image sensor 103, a control device 104, a memory card slot 105 and a monitor 106. The operation member 101 includes various input members operated by the user, such as a power button, a shutter release switch, a zoom button, a cross key, a confirm button, a reproduce button and a delete button.

While the lens 102 is constituted with a plurality of optical lens groups, the plurality of optical lens groups are represented by a single lens in FIG. 1. The image sensor 103, constituted with, for instance, a CCD or a CMOS, obtains an image by capturing a subject image formed via the lens 102. It then outputs the data constituting the obtained image (image data) to the control device 104. The control device 104 compresses the image data obtained via the image sensor 103 into a predetermined image format such as the JPEG format, generates an image file in a predetermined format such as the Exif (exchangeable image file format for digital still camera) and outputs the image file thus generated to the memory card slot 105.

Via the memory card slot 105, into which a storage medium constituted with a memory card is loaded, the image file output from the control device 104 is written and thus recorded into the memory card. In addition, an image file stored in the memory card is read via the memory card slot in response to an instruction from the control device 104.

At the monitor 106, which is a liquid crystal monitor (rear monitor) mounted at the rear side of the camera 100, an image stored in the memory card, a setting menu in which settings for the camera 100 are selected, or the like is displayed. In addition, the control device 104 obtains images from the image sensor 103 in time sequence and outputs them to the monitor 106. Thus, images in sequential frames are brought up on display at the monitor 106 over predetermined time intervals. Namely, through images (live view images) are displayed at the monitor 106.

The control device 104, constituted with a CPU, a memory and other peripheral circuits, includes functional units such as a template matching unit 104a and a subject tracking unit 104b. It is to be noted that the memory in the control device 104 includes an SDRAM and a flash memory. Of these, the SDRAM, which is a volatile memory, is used as a work memory by the CPU during program execution to expand the program or as a buffer memory where data are temporarily recorded. The flash memory is a non-volatile memory where various parameters that are read during the program execution and the like are recorded.

The template matching unit 104a in the embodiment executes template matching processing for the individual frames of through images input from the image sensor 103 to identify an area in which the photographed subject is present in each frame. The subject tracking unit 104b tracks the identified area from frame to frame. More specifically, the following processing is executed.

Figure 2:
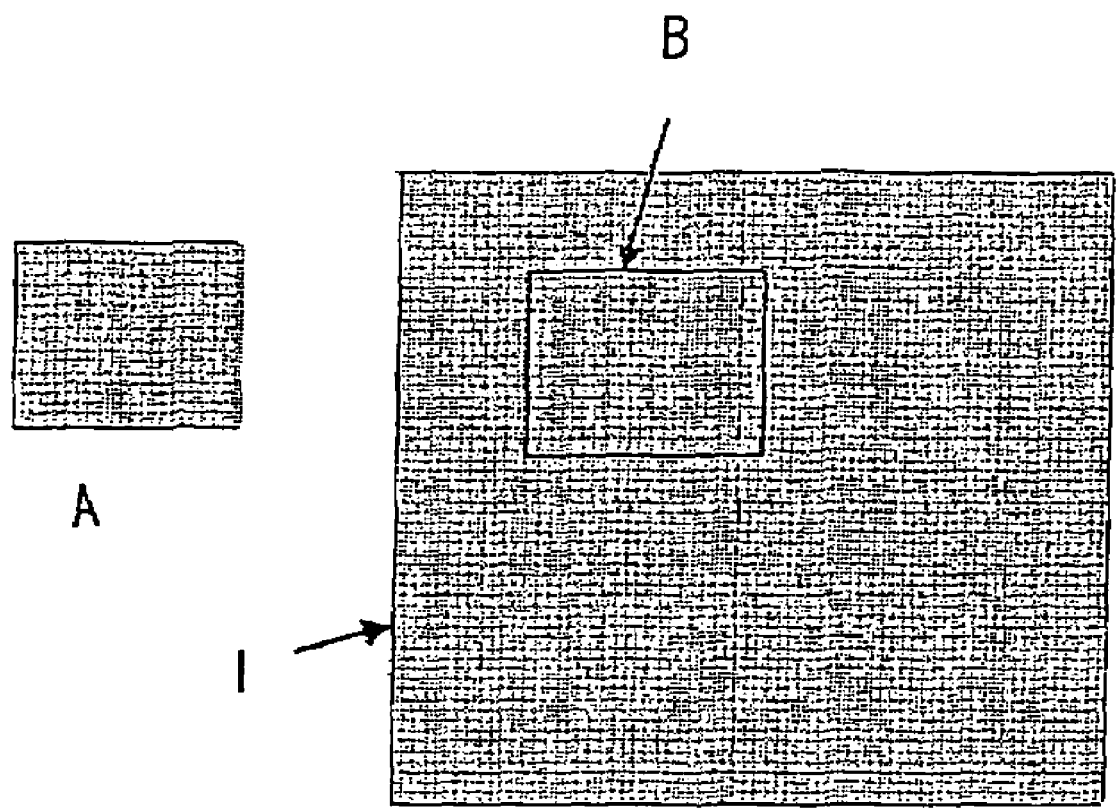
FIG. 2 presents a specific example of the target image I, the template image A and the search frame B.

The template matching unit 104a executes matching processing to match the image data (target image) in each of the frames input from the image sensor 103 in time sequence with a template image used for reference in the template matching processing. In more specific terms, it identifies the subject position within the target image I by using the template image A, as shown in FIG. 2. The template image A is obtained based upon an instruction issued by the user. For instance, as the first through image frame is displayed at the monitor 106, the user may operate the operation member 101 to specify a range containing the subject within the first frame to be tracked from frame to frame. In this case, the template matching unit 104a extracts the image contained in the range specified by the user as the template image A and stores the extracted template image into the SDRAM.

As the through image input from the image sensor 103 starts, the template matching unit 104a designates the image of each frame as the target image I and sets a search frame B assuming a size matching that of the template image at a predetermined position in the target image I. The template matching unit 104a shifts the search frame B thus set within the target image I and executes the matching processing by comparing the image within the search frame B at each position (search area image) with the template image A. Based upon the matching processing results, the template matching unit identifies the coordinate values of a match area within the target image containing a search area image with the highest level of similarity to the template image A as the subject position.

It is to be noted that the template matching unit 104a executes the template matching processing over a predetermined range (search target area) containing the position at which the template image A has been extracted from the image instead of over the entire target image I. Thus, since the template matching processing is executed over a limited range where the subject is highly likely to be present within the target image I the processing can be executed quickly. While the specific template matching method that may be adopted during this process is of the known art and is thus not described in detail, similarity factors may each be calculated as a residual sum as expressed in (1) below or as a normalized correlation expressed in (2) below.

A similarity factor calculated as the residual sum as expressed in (1) assumes a smaller value r to indicate a higher level of similarity between the template image A and the search area image. A similarity factor calculated as the normalized correlation as expressed in (2), on the other hand, assumes a larger value r to indicate a higher level of similarity between the template image A and the search area image.

$$r = \sum_m \sum_n |A_{mn} - B_{mn}| \quad (1)$$

$$r = \frac{\sum_m \sum_n (A_{mn} - \overline{A})(B_{mn} - \overline{B})}{\sqrt{\left(\sum_m \sum_n (A_{mn} - \overline{A})^2\right)\left(\sum_m \sum_n (B_{mn} - \overline{B})^2\right)}} \quad (2)$$

Figure 3A:
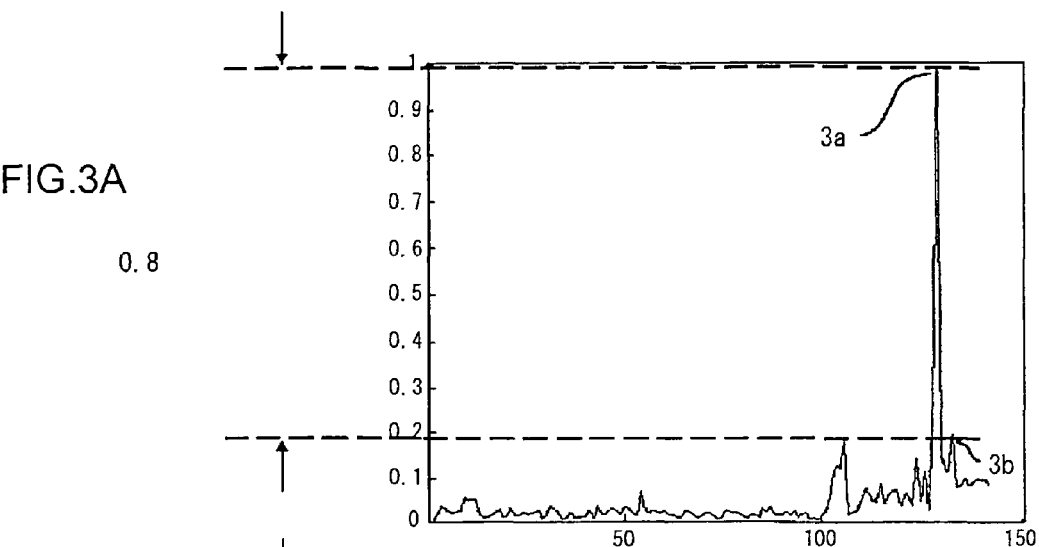
FIGS. 3A and 3B show how the similarity factor, calculated as template matching is executed by shifting the search frame B within a predetermined range of the target image I, may change.
Figure 3B:
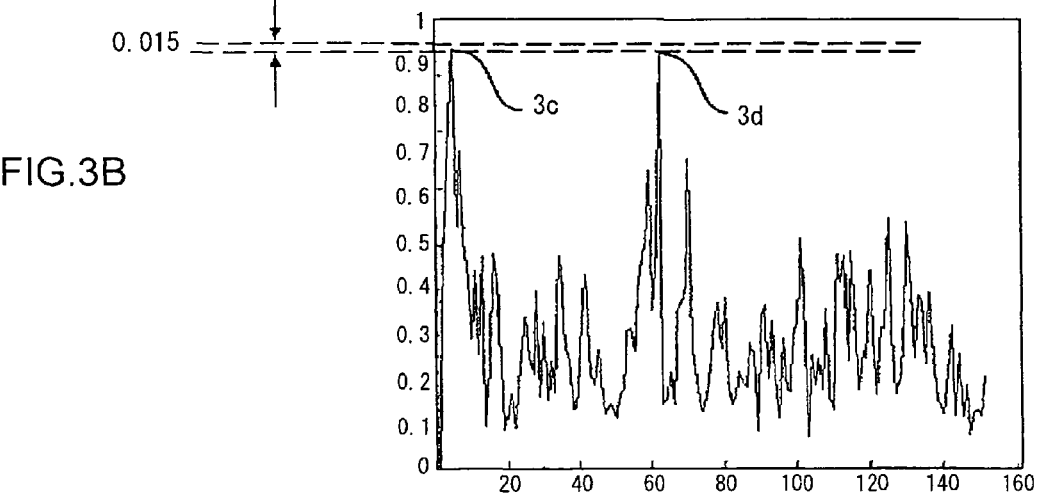

FIGS. 3A and 3B show how the similarity factor calculated as the template matching processing is executed by shifting the search frame B within the search target area in the target image I may change. In FIGS. 3A and 3B, the similarity factor is indicated along the vertical axis and the number of operational sessions is indicated along the horizontal axis. Namely, the figures each indicate similarity factors each plotted in correspondence to a given template matching session among the plurality of template matching sessions executed by shifting the search frame B. It is to be noted that each similarity factor indicated along the vertical axis assumes a normalized value between 0 and 1 and in the description of the embodiment, the value within the 0-1 range indicating the degree of similarity is referred to as a similarity factor value. A similarity factor value closer to 0 indicates a lower similarity level, whereas a similarity factor value closer to 1 indicates a higher similarity level.

The template matching unit 104a in the embodiment identifies a first match area with the highest similarity factor value indicating the highest level of similarity between the template image A and the search area image and a second match area with the second highest similarity factor value indicating the second highest level of similarity between the template image A and the search area image, based upon the results of the plurality of template matching sessions executed by shifting the search frame B within the search target area. The template matching unit 104a then designates the first match area having been identified as the subject position in the particular frame, i.e., the target image I.

When the template matching results indicate a change in the similarity factor value such as that shown in FIG. 3A, for instance, the position assumed by the search frame B in the target image I as the highest similarity factor value 3a is calculated is identified as the first match area. In addition, the position assumed by the search frame B in the target image I as the second highest similarity factor value 3b is identified as the second match area. The first match area is then determined to be the subject position in the target image I.

The template matching unit 104a calculates the absolute value of the difference between the similarity factor value (highest similarity factor) calculated for the first match area and the similarity factor value (second highest similarity factor) calculated for the second match area. If the absolute value of the difference between the similarity factor values is greater than a predetermined threshold value, e.g., if the absolute value is equal to or greater than 0.05, the reliability of the judgment that the first match area is the subject position is determined to be high. If, on the other hand, the absolute value of the difference between the similarity factor value calculated for the first match area and the similarity factor value calculated for the second match area is equal to or less than the predetermined threshold value, the reliability of the judgment that the first match area is the subject position is determined to be low.

Namely, if the difference between the similarity factor value for the first match area and the similarity factor value for the second match area satisfies the relationship expressed in expression (3) below, the template matching unit 104a decides that the reliability of the judgment that the first match area is the subject position is high, whereas if they do not satisfy the relationship expressed in (3), the template matching unit decides that the reliability is low.

$$|\text{similarity factor value for first match area} - \text{similarity factor value for second match area}| > \text{threshold value} \quad (3)$$

For instance, if the absolute value of the difference between the similarity factor value 3a for the first match area and the similarity factor value 3b for the second match area is 0.8, as shown in FIG. 3A, the template matching unit 104a decides that the reliability of the judgment that the first match area is the subject position is determined to be high. However, if the absolute value of the difference between the similarity factor value 3c for the first match area and the similarity factor value 3d for the second match area is 0.015, as shown in FIG. 3B, the template matching unit 104a judges that the reliability of the judgment that the first match area is the subject position is determined to be low.

Upon judging that the reliability of the judgment that the first match area is the subject position is determined to be low, the template matching unit 104a designates search target areas for the next frame so as to execute the template matching processing in the next frame over an area containing the first match area and a surrounding area and an area containing the second match area and a surrounding area. In the description, the area containing the first match area and the surrounding area is referred to as a first search target area and the area containing the second match area and the surrounding area is referred to as a second search target area.

Figure 4A:
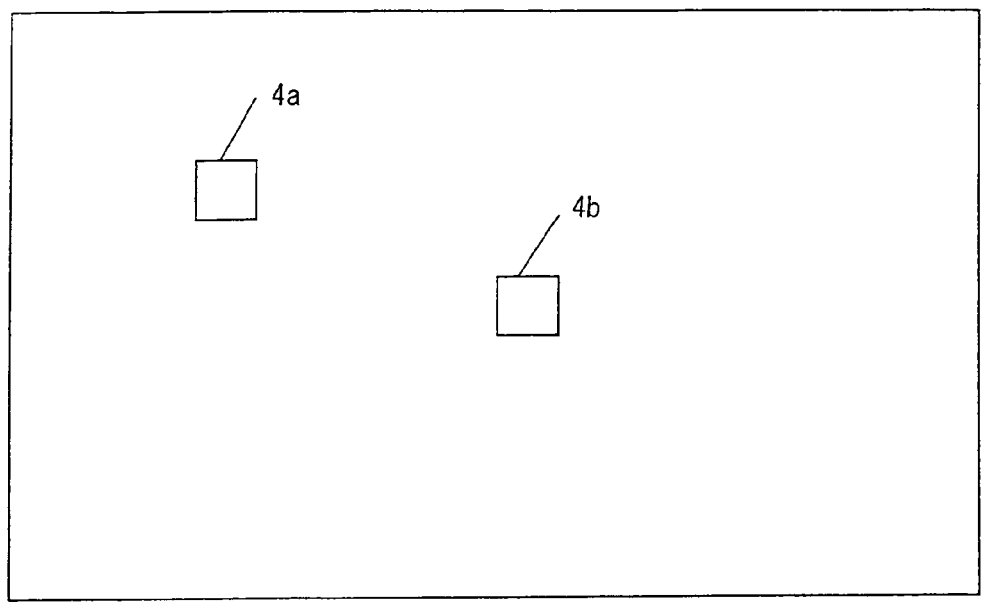
FIGS. 4A and 4B present a specific example of the first match area, the second match area, the first search target area and the second search target area.
Figure 4B:
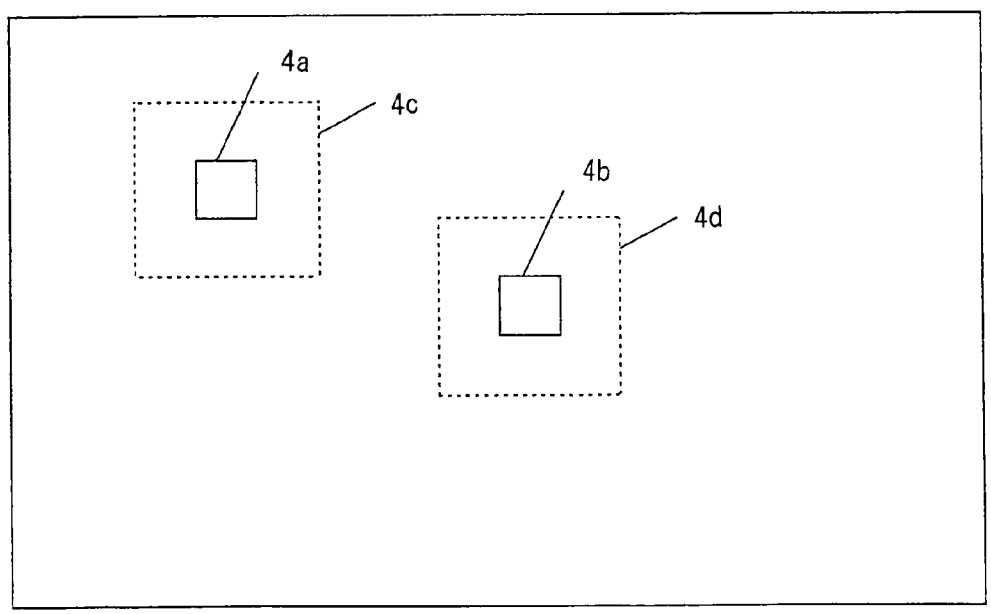

For instance, if a first match area 4a and a second match area 4b are identified as shown in FIG. 4A in the target image I, the template matching unit 104a first sets a first search target area 4c and a second search target area 4d in the target image I in the next frame, as shown in FIG. 4B. In other words, when the reliability of the judgment that first match area is the subject position in the current frame is low, the area around the second match area with the second highest similarity factor value is also designated as a search target area in the next frame, so as to improve the template matching accuracy for the next frame.

At this time, the template matching unit 104a determines the areal size of the first search target area 4c in correspondence to the similarity factor value calculated for the first match area 4a and determines the areal size of the second search target area 4d in correspondence to the similarity factor value calculated for the second match area 4b. For instance, the template matching unit 104a may calculate the vertical measurement (height) for the first search target area 4c as expressed in (4) below and calculate the horizontal measurement (width) for the first search target area 4c as expressed in (5) below. In addition, it may calculate the vertical measurement (height) for the second search target area 4d as expressed in (6) below and calculate the horizontal measurement (width) for the second search target area 4d as expressed in (7) below.

$$\text{vertical measurement for first search target area } 4c = (1 - \text{similarity factor value for first match area } 4a) \times \text{vertical measurement of target image } I \quad (4)$$

$$\text{horizontal measurement for first search target area } 4c = (1 - \text{similarity factor value for first match area } 4a) \times \text{horizontal measurement of target image } I \quad (5)$$

$$\text{vertical measurement for second search target area } 4d = (1 - \text{similarity factor value for second match area } 4b) \times \text{vertical measurement of target image } I \quad (6)$$

$$\text{horizontal measurement for second search target area } 4d = (1 - \text{similarity factor value for second match area } 4b) \times \text{horizontal measurement of target image } I \quad (7)$$

The template matching unit 104a executes the template matching processing by using the template image A over the first search target area and the second search target area in the next frame. The template matching unit 104a identifies the first match area and the second match area in both the first search target area and the second search target area. The template matching unit 104a compares the similarity factor value calculated for the first match area identified in the first search target area with the similarity factor value calculated for the first match area identified in the second search target area and determines the first match area with the higher similarity factor value to be the subject position in the frame.

The template matching unit then determines the reliability of the judgment that the first match area is the actual subject position based upon similarity factors calculated for the first match area and the second match area identified in the search target area containing the first match area having been determined to be the subject position as expressed in (3). Subsequently, the processing described above is executed in a similar manner.

Upon judging that the reliability of the judgment that the first match area is the actual subject position is high, the template matching unit 104a sets a search target area containing the first match area and the surrounding area for the next frame so as to execute the template matching processing accordingly. It then executes the template matching processing as described earlier by using the template image A over the search target area thus set.

The subject tracking unit 104b displays a target frame over the range within which the subject is present at the subject position determined by the template matching unit 104a through the processing described above, thereby indicating to the user the position at which the subject is present within the frame. Namely, the subject tracking unit 104b displays a target frame enclosing the first match area determined to be the subject position within the target image I in each frame so as to indicate the subject position in the target image I. As the processing described above is executed for each of the individual frames of through images input in time sequence, the target frame is displayed at the subject position in each frame, enabling frame-to-frame subject tracking.

Figure 5:
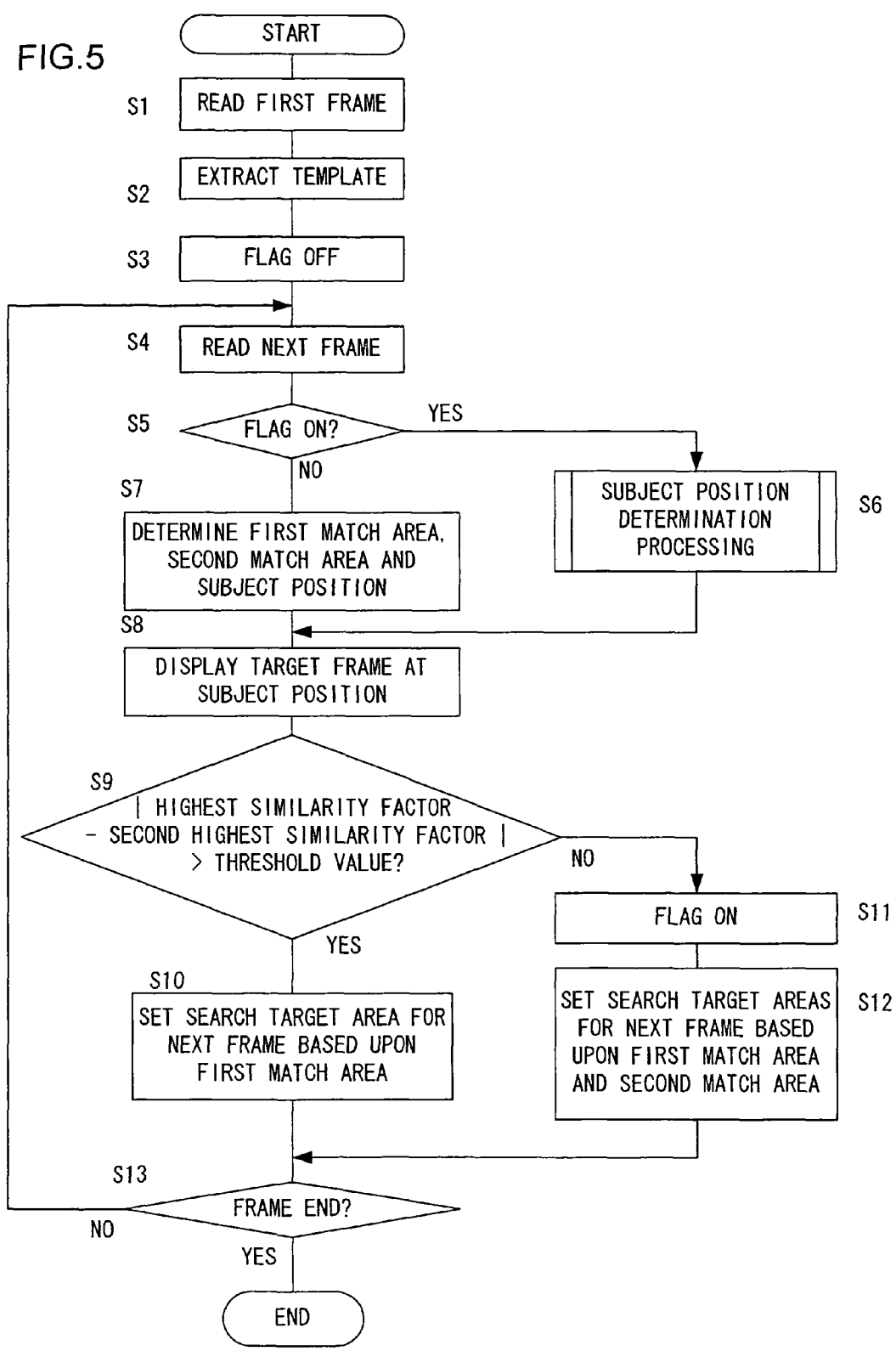
FIG. 5 presents a flowchart of the processing executed by the subject tracking device 100.

FIG. 5 presents a flowchart of the processing executed by the subject tracking device 100 in the embodiment. The processing in FIG. 5 is executed by the control device 104 based upon a program started up as a through image input from the image sensor 103 starts.

In step S1, the template matching unit 104a reads the first through image frame and then the operation proceeds to step S2. In step S2, the template matching unit 104a extracts the template image A from the first frame having been read, in response to an instruction from the user, as explained earlier. The operation then proceeds to step S3.

In step S3, the template matching unit 104a sets a flag FLAG, which indicates the reliability of the judgment that the first match area is the subject position, to OFF. It is to be noted that the FLAG at the ON setting indicates that the reliability of the judgment that the first match area is the subject position is low and that the FLAG at the OFF setting indicates that the reliability of the judgment that the first match area is the subject position is high in the processing shown in FIG. 5. The operation subsequently proceeds to step S4, in which the template matching unit 104a reads the next through image frame before the operation proceeds to step S5.

In step S5, the template matching unit 104a makes a decision as to whether or not the FLAG is currently set to ON. If a negative decision is made, the operation proceeds to step S7 in which the template matching unit 104a executes similarity factor calculation by comparing the image contained within the search frame B at each position with the template image A while shifting the search frame B within the search target area set in the target image I, as explained earlier. The template matching unit 104 then identifies the first match area for which the highest similarity factor value has been calculated and the second match area for which the second highest similarity factor value has been calculated and determines the first match area to be the subject position, as described earlier. The operation then proceeds to step S8. If, on the other hand, an affirmative decision is made in step S5, the operation proceeds to step S6 in which the template matching unit 104a executes subject position determination processing to be described later in reference to FIG. 6, and then the operation proceeds to step S8.

In step S8, the subject tracking unit 104b displays the target frame at the subject position in the frame and the operation proceeds to step S9. In step S9, the template matching unit 104a makes a decision as to whether or not the absolute value of the difference between the similarity factor value (highest similarity factor) for the first match area and the similarity factor value (second highest similarity factor) for the second match area is greater than the predetermined threshold value, as expressed in (3). If an affirmative decision is made, the operation proceeds to step S10.

In step S10, the template matching unit 104a sets a search target area for the next frame so as to execute the template matching processing over the search target area containing the first match area and the surrounding area, as explained earlier. Subsequently, the operation proceeds to step S13 in which the template matching unit 104a makes a decision as to whether or not the frame input, i.e., the through image input, from the image sensor 103 has ended. If a negative decision is made, the operation returns to step S4 to repeatedly execute the processing. If, on the other hand, an affirmative decision is made, the processing ends.

If a negative decision is made in step S9, the operation proceeds to step S11. In step S11, the template matching unit 104a sets the FLAG to ON to indicate that the reliability of the judgment that the first match area is the subject position is low. The operation then proceeds to step S12 in which the template matching unit 104a sets search target areas for the next frame so as to execute the template matching processing over two search target areas, one containing the first match area and the surrounding area and the other containing the second match area and the surrounding area. Subsequently, the operation proceeds to step S13.

Figure 6:
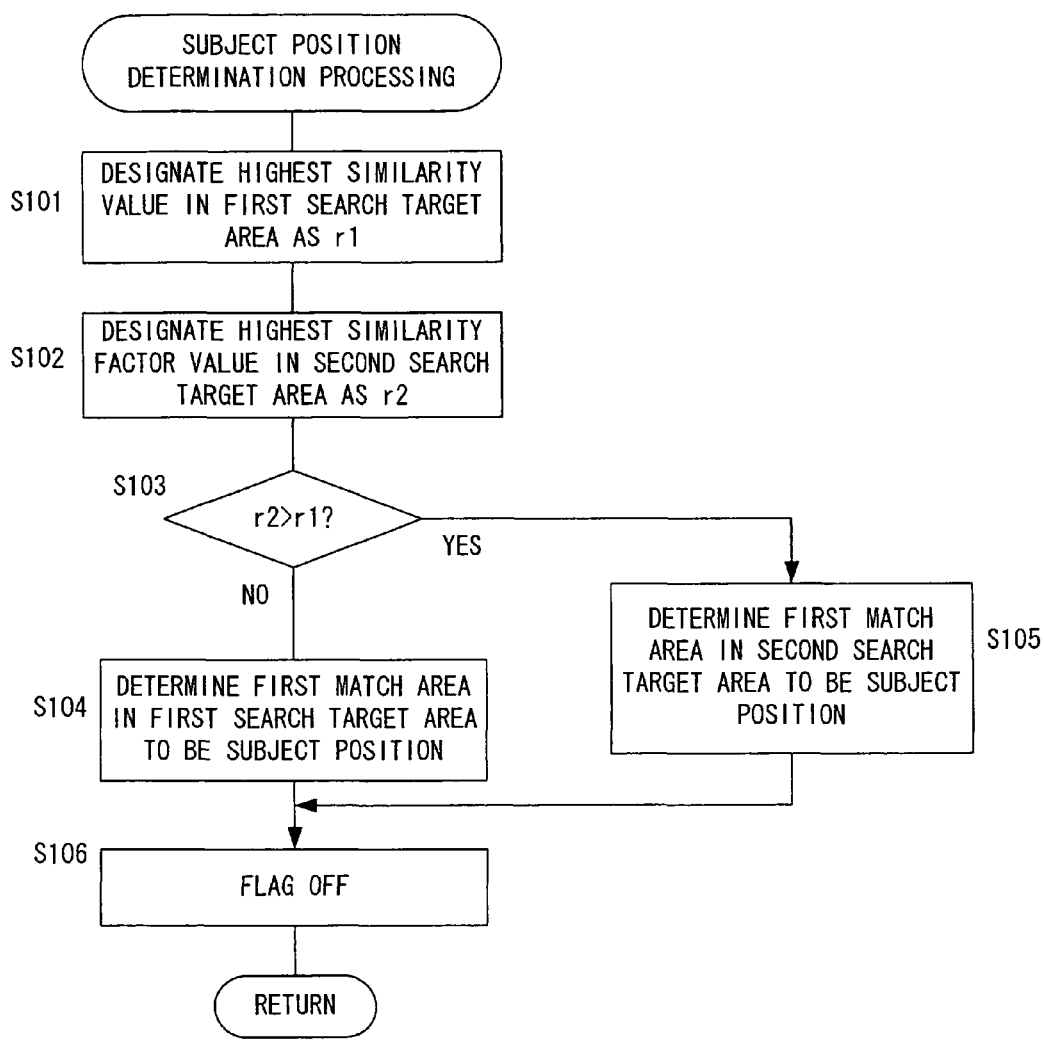
FIG. 6 presents a flowchart of the similarity factor value comparison processing.

FIG. 6 presents a flowchart of the subject position determination processing executed in step S6. In step S101, the template matching unit 104a executes similarity factor calculation by comparing the image contained in the search frame B at each position with the template image A while shifting the search frame B within the first search target area having been set in step S12, as explained earlier, based upon the first match area. The template matching unit 104a then identifies a first match area for which the highest similarity factor value has been calculated and the second match area for which the second highest similarity factor value has been calculated. It designates the similarity factor value calculated for the first match area thus identified as r1. The operation then proceeds to step S102.

In step S102, the template matching unit 104a executes similarity factor calculation by comparing that image contained in the search frame B at each position with the template image A while shifting the search frame B within the second search target area having been set in step S12, as explained earlier based upon the second match area. The template matching unit 104a then identifies a first match area for which the highest similarity factor value has been calculated and the second match area for which the second highest similarity factor value has been calculated. It designates the similarity factor value calculated for the first match area thus identified as r2. The operation then proceeds to step S103.

In step S103, the template matching unit 104a compares r1 with r2 and makes a decision as to whether or not the relationship expressed as r2>r1 exists. If a negative decision is made, the operation proceeds to step S104, in which the template matching unit 104a determines the first match area identified in the first search target area to be the subject position before the operation proceeds to step S106. If, on the other hand, an affirmative decision is made, the operation proceeds to step S105 in which the template matching unit 104a determines the first match area identified in the second search target area to be the subject position before the operation proceeds to step S106. In step S106, the FLAG currently at the ON setting is switched to OFF and then the operation returns to the processing shown in FIG. 5.

The embodiment described above achieves the following advantages.

(1) The template matching unit 104a calculates the similarity factor value indicating the level of similarity between the image within the search frame at each search frame position and the template image by shifting the search frame within the search target area set in each of image frames input in time sequence. It then determines the position in the image area contained in the search frame for which the highest similarity factor value has been calculated to be the position of the subject (subject position). The subject tracking unit 104b tracks the subject position determined by the template matching unit 104a through a plurality of input image frames. The template matching unit 104a identifies the first match area with the highest similarity factor value and the second match area with the second highest similarity factor value. If the absolute value of the difference between the similarity factor value calculated for the first match area and the similarity factor value calculated for the second match area is equal to or smaller than the predetermined threshold value, search target areas for the next frame are set in correspondence to the first match area and the second match area. Thus, if the reliability of the judgment that the first match area is the subject position in the current frame is low, another search target area, i.e., an area containing the second match area with the second highest similarity factor value and the surrounding area, is added as a search target area for the next frame, thereby assuring improved template matching accuracy for the next frame.

(2) The template matching unit 104a designates an area containing the first match area and the surrounding area as a first search target area and an area containing the second match area and the surrounding area as a second search target area. Since the processing is executed for the next frame over limited areas where the likelihood of the subject being present is high, the processing can be executed quickly.

(3) The template matching unit 104a determines the areal sizes of the first search target area and the second search target area respectively in correspondence to the similarity factor value calculated for the first match area and the similarity factor value calculated for the second match area. As a result, the optimal search ranges corresponding to the similarity factor values having been calculated for the individual match areas can be set for the next frame.

(4) When the first search area and the second search area are set as search areas in the next frame, the template matching unit 104*a* calculates similarity factor values in correspondence to both search target areas. It then determines the first match area in either search target area that assumes a higher similarity factor value to be the subject position. In other words, the subject position can be ascertained with a high level of accuracy in either the first search area or the second search area that is more likely to contain the subject.

—Variations—

It is to be noted that the camera achieved in the embodiment described above allows for the following variations.

(1) The template matching unit 104*a* in the embodiment identifies the first match area with the highest similarity factor value indicating the highest level of similarity between the search area image and the template image A and the second match area with the second highest similarity factor value indicating the second highest level of similarity between the search area image and the template image A. However, the number of match areas to be identified by the template matching unit is not limited to two and it may also identify, for instance, a third match area with the third-highest similarity factor value. In other words, the template matching unit may identify three or more match areas. In such a case, the template matching unit 104*a* may set a search target area for the next frame based upon a match area with the similarity factor value thereof manifesting a difference less than a predetermined threshold value, e.g. 0.05, relative to the similarity factor value calculated for the first match area.

(2) In the embodiment described above, the camera 100 is used as the subject tracking device and the subject is tracked from a through image frame to another through image frame. However, the template matching processing may be executed in a camera 100 equipped with a movie (motion picture) shooting function so as to track the subject through the frames constituting the movie. In addition, a program that enables the processing shown in FIGS. 5 and 6 may be recorded in another device capable of reproducing such movies, e.g., a personal computer, and the subject tracking may be achieved in the personal computer by executing the program.

Figure 7:
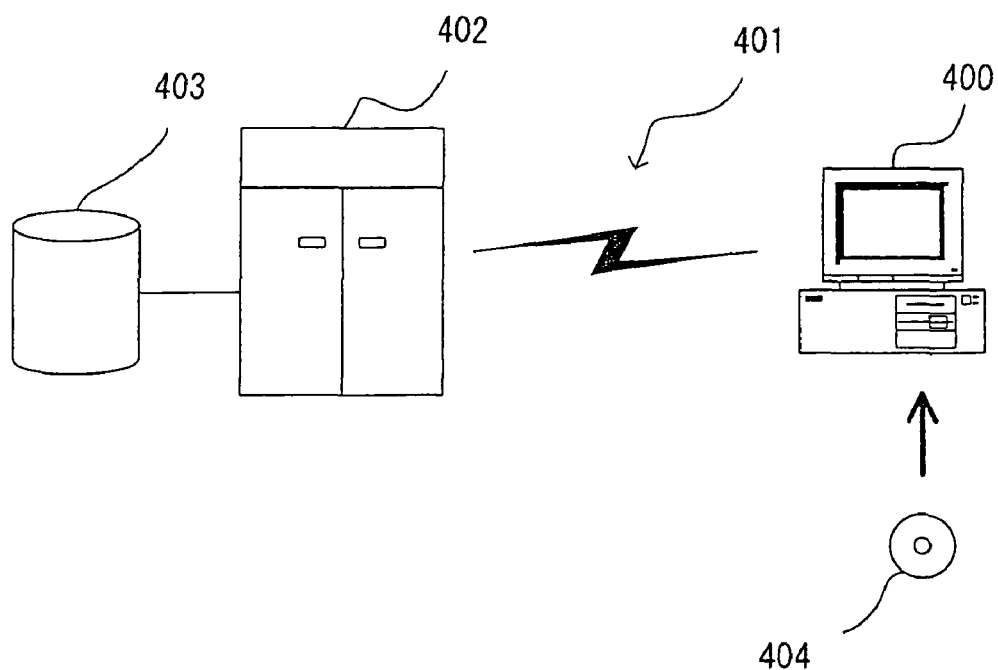
FIG. 7 illustrates how the program may be provided to a personal computer.

(3) In addition, when the present invention is adopted in a personal computer or the like, the program related to the control described above may be provided to the personal computer via a recording medium such as a CD-ROM or via data signals exchanged on the Internet or the like. FIG. 7 illustrates how the program may be provided through such media. A personal computer 400 receives the program via a CD-ROM 404. The personal computer 400 also has a connection capability to connect with a communication line 401. A computer 402 is a server computer that provides the program stored in a recording medium such as a hard disk 403. The communication line 401 may be a communication network such as the Internet or it may be a dedicated communication network. The computer 402 reads out the program from the hard disk 403 and transmits the program thus read out to the personal computer 400 via the communication line 401. Namely, the program may be embodied as a data signal on a carrier wave and transmitted via the communication line 401. In short, the program can be distributed as a computer-readable computer program product assuming any of various modes such as a recording medium and a data signal.

The above described embodiments are examples and various modifications can be made without departing from the scope of the invention.

What is claimed is:

1. A subject tracking method, comprising:
calculating a similarity factor indicating a level of similarity between an image contained in a search frame at each search frame position and a template image by shifting the search frame within a search target area set in each of individual frames of input images input in time sequence;
determining a position of the search frame for which a highest similarity factor value has been calculated, within each input image to be a position (subject position) at which a subject is present;
tracking the subject position thus determined through the individual frames of input images;
calculating a difference between a highest similarity factor value and a second highest similarity factor value; and
setting the search target area for a next frame based upon the calculated difference.

2. A subject tracking method according to claim 1, wherein:
if the difference is equal to or less than a predetermined threshold value, a search frame position with the highest similarity factor value and a search frame position with the second highest similarity factor value are both designated as subject position candidates; and
the search target area for the next frame is set based upon the search frame positions designated as the subject position candidates.

3. A subject tracking method according to claim 2, wherein:
an area of a predetermined size, containing the search frame at each of the search frame positions designated as the subject position candidates, is set as the search target area for the next frame.

4. A subject tracking method according to claim 3, wherein:
the size of the search target area is determined based upon the similarity factor value calculated for the corresponding search frame.

5. A subject tracking method according to claim 1, wherein:
if the difference is greater than a predetermined threshold value, a search frame position with the highest similarity factor value is designated as a subject position candidate; and
the search target area for the next frame is set based upon the search frame position designated as the subject position candidate.

6. A subject tracking method according to claim 1, wherein:
if the difference is equal to or less than a predetermined threshold value, a search frame position with the highest similarity factor value and a search frame position with the second highest similarity factor value are both designated as subject position candidates;
if the difference is greater than the threshold value, a search frame position with the highest similarity factor value is designated as a subject position candidate; and
the search target area for the next frame is set based upon the search target position(s) designated as the subject position candidate(s).

7. A subject tracking method according to claim 1, wherein:
if a plurality of search target areas is set, similarity factor values are calculated in correspondence to each of the search target areas; and the position of the search frame for which the highest similarity factor value has been calculated in the input image is determined to be the subject position.

8. A non-transitory computer-readable storage medium containing a subject tracking control program, the control program comprising:

a similarity factor calculation instruction for calculating a similarity factor value indicating a level of similarity between an image contained in a search frame at each search frame position and a template image by shifting the search frame within a search target area set in each of individual frames of input images input in time sequence;

a subject position determination instruction for determining a position of the search target for which a highest similarity factor value has been calculated in the similarity factor calculation instruction within each input image to be a position (subject position) at which a subject is present;

a subject tracking instruction for tracking the subject position determined in the subject position determination instruction through the individual frames of input images;

a difference calculation instruction for calculating a difference between the highest similarity factor value and a second highest similarity factor value, both calculated in the similarity factor calculation instruction; and a search target area setting instruction for setting the search target area for a next frame based upon the difference calculated in the difference calculation instruction.

9. A non-transitory computer-readable storage medium to claim 8, further comprising:

a subject position candidate designation instruction for designating a search frame position with the highest similarity factor value and a search frame position with the second highest similarity factor value as subject position candidates when the difference calculated in the difference calculation instruction is equal to or less than a predetermined threshold value, wherein:

in the search target area setting instruction, the search target area for the next frame is set based upon the search frame positions designated as the subject position candidates in the subject position candidate designation instruction.

10. A non-transitory computer-readable storage medium to claim 9, wherein:

in the search target area setting instruction, an area assuming a predetermined size, containing the search frame at each of the search frame positions designated as subject position candidates in the subject position candidate designation instruction, is set as the search target area for the next frame.

11. A computer-readable computer program product according to claim 10, wherein:

in the search target area setting instruction, the size of the search target area is determined based upon the similarity factor value calculated for the corresponding search frame.

12. A non-transitory computer-readable storage medium to claim 8, further comprising:

a subject position candidate designation instruction for designating a search frame position with the highest similarity factor value as a subject position candidate when the difference calculated in the difference calculation instruction is greater than a predetermined threshold value, wherein:

in the search target area setting instruction, the search target area for the next frame is set based upon the search frame position designated as the subject position candidate in the subject position candidate designation instruction.

13. A non-transitory computer-readable storage medium to claim 8, further comprising:

a subject position candidate designation instruction for designating a search frame position with the highest similarity factor value and a search frame position with the second highest similarity factor value as subject position candidates when the difference calculated in the difference calculation instruction is equal to or less than a predetermined threshold value, and designating a search frame position with the highest similarity factor value as a subject position candidate when the difference calculated in the difference calculation instruction is greater than the threshold value, wherein:

in the search target area setting instruction, the search target area for the next frame is set based upon the search frame position(s) designated as the subject position candidate(s) in the subject position candidate designation instruction.

14. A non-transitory computer-readable storage medium to claim 8, wherein:

if a plurality of search target areas are set in the search target area setting instruction, similarity factor values are calculated in correspondence to each of the search target areas in the similarity factor calculation instruction, and the position of the search frame for which the highest similarity factor value has been calculated within the input image in the similarity factor calculation instruction, is determined to be the subject position in the subject position determination instruction.

15. A subject tracking device, comprising:

an execution device that executes a control program according to claim 8.

* * * * *